(12) United States Patent
Walters

(10) Patent No.: US 8,313,019 B2
(45) Date of Patent: Nov. 20, 2012

(54) SECURE CHECK CAPTURE DEVICE

(75) Inventor: Robert Walters, Northville, MI (US)

(73) Assignee: Burroughs, Inc., Plymouth, MI (US)

( * ) Notice: Subject to any disclaimer, the term of this patent is extended or adjusted under 35 U.S.C. 154(b) by 241 days.

(21) Appl. No.: 12/033,437

(22) Filed: Feb. 19, 2008

(65) Prior Publication Data

US 2009/0001158 A1    Jan. 1, 2009

Related U.S. Application Data

(60) Provisional application No. 60/937,334, filed on Jun. 27, 2007.

(51) Int. Cl.
*G06Q 40/00* (2012.01)
(52) U.S. Cl. ......................................... 235/379; 235/375
(58) Field of Classification Search .................. 235/379; 705/45
See application file for complete search history.

(56) References Cited

U.S. PATENT DOCUMENTS

| | | | | |
|---|---|---|---|---|
| 4,564,752 A * | 1/1986 | Lepic et al. | ................... | 235/437 |
| 4,787,518 A * | 11/1988 | Yuge et al. | ................... | 209/534 |
| 6,266,930 B1 * | 7/2001 | Kitabatake | ........................ | 52/27 |
| 6,554,185 B1 * | 4/2003 | Montross et al. | .............. | 235/379 |
| 2005/0018214 A1 * | 1/2005 | DeWitt et al. | .................. | 358/1.1 |
| 2006/0202013 A1 * | 9/2006 | VanKirk et al. | ................ | 235/379 |
| 2006/0208413 A1 * | 9/2006 | Graef et al. | ................ | 271/10.01 |
| 2007/0138255 A1 * | 6/2007 | Carreon et al. | ................ | 235/379 |

* cited by examiner

*Primary Examiner* — Michael G Lee
*Assistant Examiner* — Matthew Mikels
(74) *Attorney, Agent, or Firm* — Honigman Miller Schwartz and Cohn LLP

(57) ABSTRACT

A check capture device is disclosed. The check capture device includes a housing including a secure check storage area. The check capture device further includes a check scanner configured to electronically capture information from one or more checks. The check capture device also includes control logic configured to route checks successfully scanned by the check scanner into the secure check storage area. A method of capturing check information is also disclosed.

17 Claims, 6 Drawing Sheets

SECURE CHECK CAPTURE DEVICE

REFERENCE TO RELATED APPLICATION

This application claims priority to U.S. Provisional Application No. 60/937,734 which is commonly assigned and filed on Jun. 27, 2007 and entitled "Secure Check Capture Device", the contents of which are hereby incorporated by reference in their entirety;

TECHNICAL FIELD

The present disclosure relates to electronic capture of information printed on checks. More specifically, the present disclosure relates to a secure device for electronic capture of information printed on checks.

BACKGROUND

Most commercial businesses, such as merchants, insurance agents, stock brokers, or attorneys, accept checks as a method of payment. Those businesses which are capable of capturing the check image and routing information can electronically communicate with banking systems to "clear" the check, establishing that the check is drawn on an account having sufficient funds. This electronic clearing provides a business advantage by reducing the time between check receipt and clearing.

Current electronic check clearing machines scan checks that are placed into them by a user, and return those checks to that user. These machines can communicate with the user to signify whether or not the check was successfully scanned.

Users of check clearing machines generally will include cashiers or other employees of the commercial businesses employing the machines. Unsupervised, unscrupulous employees can steal the physical check and deposit it at a bank or use it as a basis for forgery because the employees can take the check as it is output from the scanner. In such a case, the verified funds can be diverted from the commercial business.

For at least these reasons, improvements are desired.

SUMMARY

In accordance with the below disclosure, the above and other problems are solved by the following:

According to a first aspect, a check capture device is disclosed. The check capture device includes a housing including a secure check storage area. The check capture device further includes a check scanner configured to electronically capture information from one or more checks. The check capture device also includes control logic configured to route checks successfully scanned by the check scanner into the secure check storage area.

According to a second aspect, a method of capturing check information is disclosed. The method includes receiving a check in a secure check capture device. The method also includes scanning information printed on the check. The method further includes evaluating the information that was scanned. The method includes electronically storing the information, and securely storing the check.

DETAILED DESCRIPTION

Figure 1:
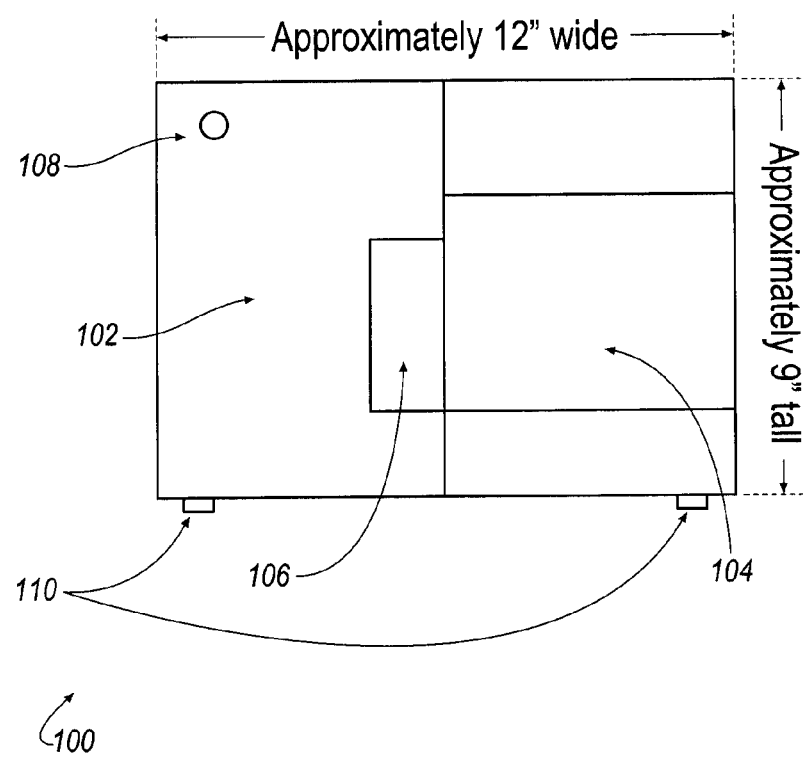
FIG. 1 is a schematic front plan view of a secure check capture device according to a possible embodiment of the present disclosure.

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

The present disclosure relates generally to a secure check capture device. The secure check capture device is configured for electronic capture of information printed on checks. A check, as it is described here, refers to any of a number of negotiable instruments upon which identifying information related to transfer of funds can be identified. Checks include both traditional checks as well as related check-sized documents, such as stubs or remittances. The secure check capture device can be, in various instances, one of a variety of stand-alone kiosk type devices located in bank branches, public buildings or retail locations where a depositor or check writer will insert the check into the kiosk for the purpose of payment.

Referring now to FIG. 1, a schematic front plan view of a secure check capture device 100 is shown according to a possible embodiment of the present disclosure. The device 100 receives one or more checks from a user, captures information printed on the check, and securely stores the check. The device 100 prevents a user or other individual from attempting to draw funds from the account associated with the check for a purpose other than the one for which the check was issued.

The device 100 has a housing 102 which houses a check scanner 104 and a rejected check output chute 106. The housing 102 can generally be any size or shape, so long as it provides a secure containment area for checks whose printed information has successfully been electronically captured. In one embodiment, the housing has external dimensions of about 12 inches wide by about 9 inches tall by about 12 inches deep. In various embodiments, the housing 102 is a plastic, metal or other rigid material resistant to puncture or unauthorized access. The exact size and materials of the housing is largely dependent on user choice.

The check scanner 104 electronically captures information printed on a check. The check scanner 104 can be any of a number of scanning devices configured to capture printed content in an electronic format, such as an image or text through optical character recognition (OCR). In various embodiments, the check scanner can be a SourceNDP scanner, from Unisys Corporation. Other check scanner units, such as a MyVision X scanner or a UEC7000 scanner, also from Unisys Corporation. Alternative scanner units, such as later developed or more advanced scanner units, may be used as well.

The rejected check output chute 106 provides an output from the housing such that unsuccessfully scanned checks can be returned to the user of the device 100. Functionality of the device 100 which results in a check output into the check output chute 106 is described below in conjunction with FIGS. 3-6.

The device 100 includes a key lock 108 disposed on the housing 102 which allows an authorized user, such as the supervisor of a typical user of the device 100, to insert a key (not shown) to unlock or lock the housing, thereby controlling access to the checks secured within the housing 102. The device 100 optionally also includes bolts 110 configured to mount the housing 102 to a table or other surface, such that the entire device cannot be easily stolen.

Authorized users of the device 100 may vary according to the application and location of the device. For example, authorized users may include supervisors, financial institution representatives, couriers, or other trusted individuals allowed to access physical copies of checks.

Figure 2:
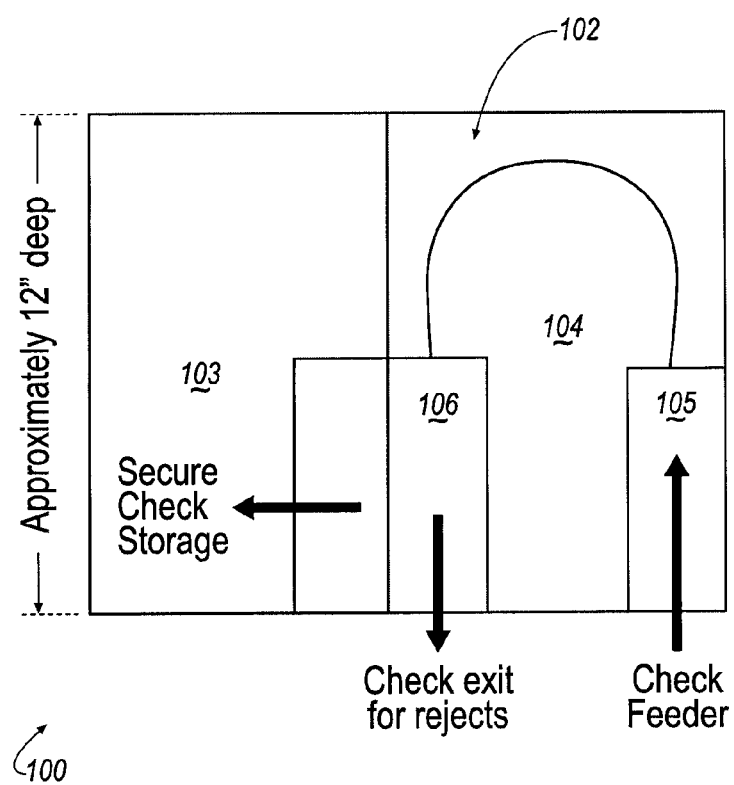
FIG. 2 is a schematic top cross sectional view of the secure check capture device of FIG. 1.

FIG. 2 is a schematic top cross sectional view of the secure check capture device 100 of FIG. 1. The housing 102 of the check capture device 100 includes a secure check storage area 103, as referenced above in conjunction with FIG. 1, which resides within the housing and stores physical checks whose information has successfully been scanned by the scanner. The secure check storage area 103 is generally inaccessible external to the device, but can be accessed by a person who can open the housing 102 using the key lock 108.

As shown, the check scanner 104 includes a check feeder 105 which can receive one or more checks into the scanner 104. In one embodiment, the check feeder 105 receives 100 or more checks at once for scanning and information capture. A check can be received at the check feeder 105, fed through the scanner 104, and output to either the secure check storage area 103 if successfully scanned, or to the rejected check output chute 106 if unsuccessfully scanned.

The specific locations of components of the device 100, as well as the routing of checks through the device 100 may vary in different embodiments, although the general operative principles of the device 100 remain the same.

Figure 3:
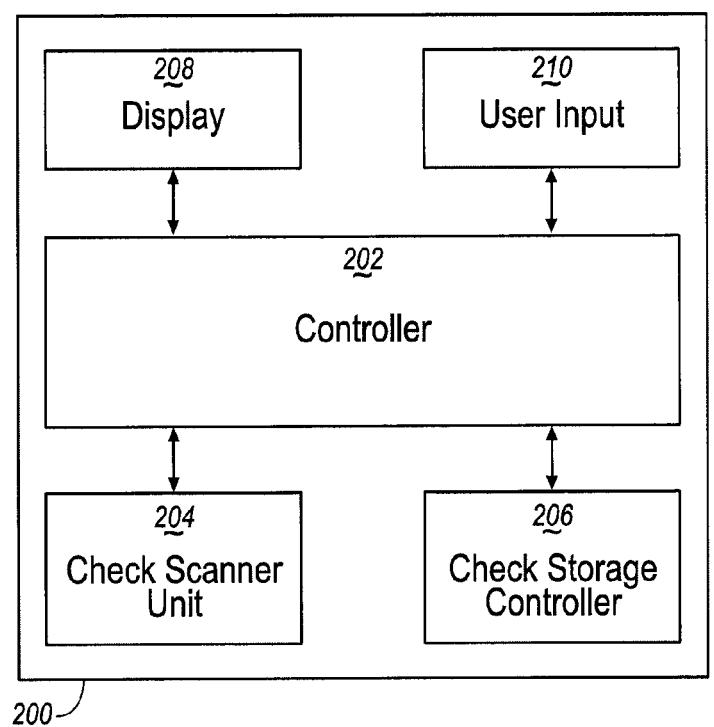
FIG. 3 is a block diagram illustrating example components of a secure check capture device according to a possible embodiment of the present disclosure.

FIG. 3 is a block diagram illustrating example components of a secure check capture device 200 according to a possible embodiment of tire present disclosure. The device 200 may represent, for example, the logical connections in the device 100 of FIGS. 1-2. The device 200 includes a controller 202 operatively connected to a check scanner 204 and a check storage controller 206. The device 200 also optionally includes a display 208 and a user input device 210 operatively connected to the controller 202.

The controller 202 can be any of a number of programmable circuits configurable to execute a programmed hardware or software algorithm. The controller interfaces with and controls the scanner 204, check storage controller 206, and the optional display 208 and user input device 210. In various embodiments, the controller 202 can be a multipurpose electronic control unit, such as a central processing unit system. In a further embodiment, the controller 202 can be a programmed special purpose processor, such as a programmable logic device. Other embodiments are possible as well.

The scanner 204 can be any type of check scanner, such as those previously described. The scanner 204 is operatively connected to the controller 202, which may direct the scanner to scan one or more checks as they are presented to the device, such as by placement within a check feeder, such as the check feeder 105 of FIG. 2. In one embodiment, the scanner 204 is directed to scan one check at a time, as initiated by a user. Such an embodiment can be described such as in the operation of the system of FIG. 5, below. In a second embodiment, the scanner 204 is directed to scan a number of checks automatically, without intermediate input from a user. This embodiment can be described by the operation of the system of FIG. 6, below.

The check storage controller 206 directs checks to either an internal check storage department of the device 200, or out from the device if the check is not scanned successfully. In the device 100 of FIGS. 1-2, the controller 206 directs a check either into the secure check storage area 103, or the rejected check output chute 106. Other embodiments are possible as well.

The display 208 can be any of a number of types of displays, such as an LCD display, a cathode ray tube display (CRT), or any other type of display. The user input device 210 corresponds to a keypad, touchscreen, or other type of device. Other input devices are possible as well.

Fewer or additional components may be present in an embodiment of the device 200. For example, if the input device is a touchscreen, another display may not be necessary. Alternately, an input device or display may not be necessary altogether, depending upon the particular implementation chosen.

Figure 4:
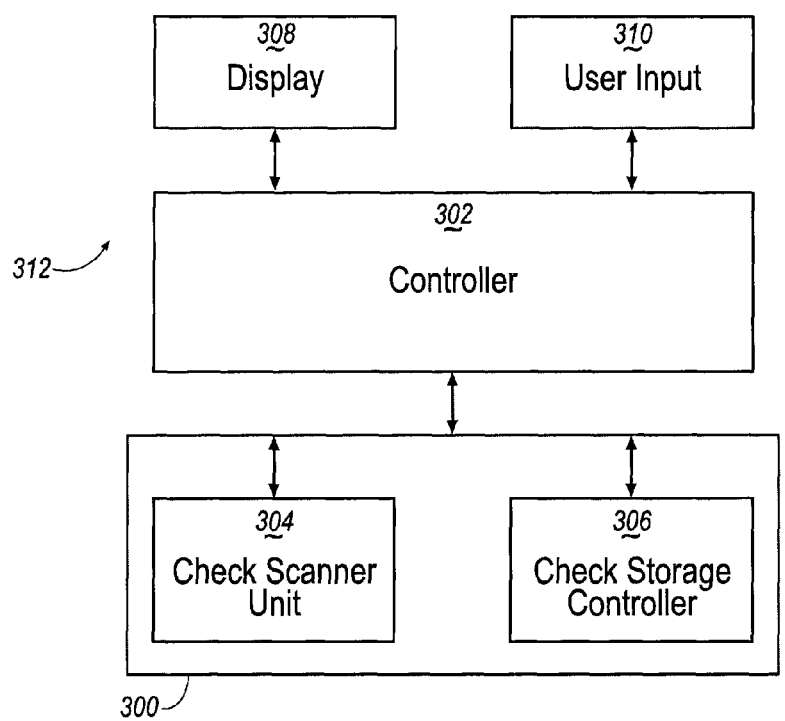
FIG. 4 is a block diagram illustrating example components of a secure check capture device according to a possible embodiment of the present disclosure.

FIG. 4 is a block diagram illustrating example components of a secure check capture device 300 according to a second possible embodiment of the present disclosure. The device 300 may represent, for example, the logical connections in the device 100 of FIGS. 1-2. The device 300 generally corresponds to the device 200 of FIG. 3, with like components providing like functionality for the operation of the device. In the embodiment shown, the controller 302, display 308, and input device 310 are separated from the device 300 itself, and may be implemented as a personal computer 312 interfaced to the device. The personal computer 312 can be interfaced to the device 300 by any of a number of communication methods, such as wired or wireless communication systems. Example systems can include a Universal Serial Bus (JSB), 802.11 wireless connection, infrared connection, RS-232 serial communication bus, 802.3 wired Ethernet connection, or other buses, plus technologies such as thin-client or web services interconnection systems.

Alternately, the device 200 such as shown in FIG. 3 may include the controller, display, and input device to accomplish one or more functions of the device, while other functions may be controlled through an interface to a personal computer such as the personal computer 312 of FIG. 4 executing an application directed to controlling the device 200. Other implementations are possible as well.

Figure 5:
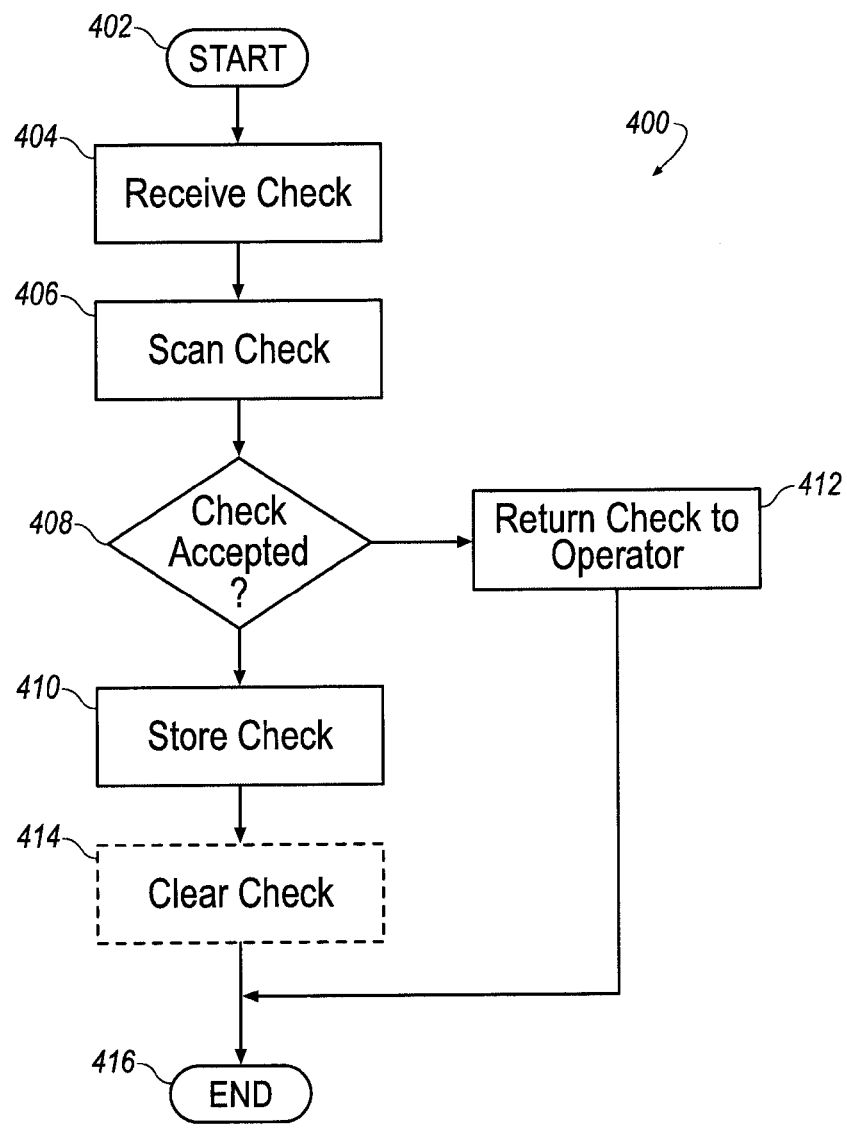
FIG. 5 is a flowchart of methods and systems for secure electronic capture of information printed on checks according to a possible embodiment of the present disclosure.
Figure 6:
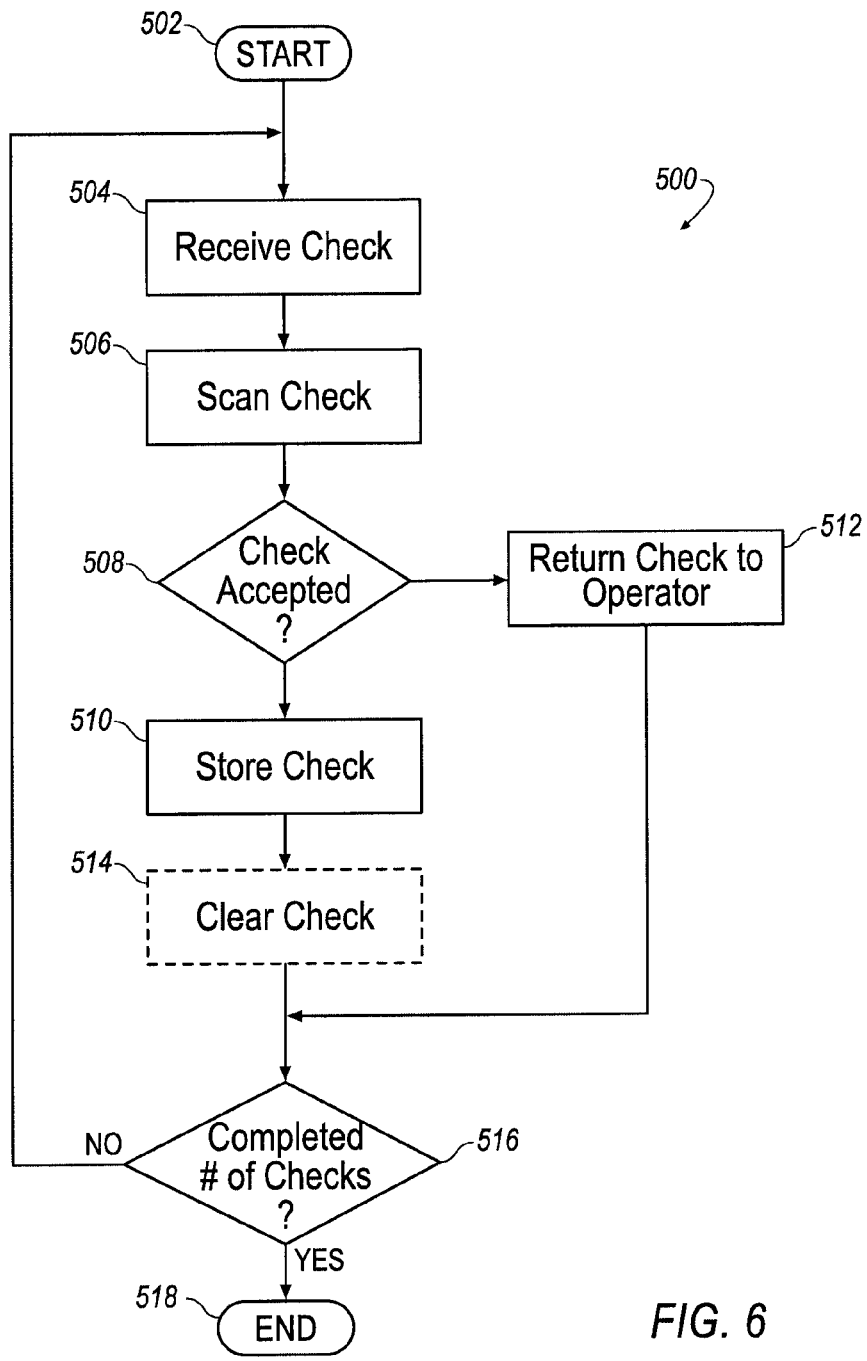
FIG. 6 is a flowchart of methods and systems for secure electronic capture of information printed on checks according to a further possible embodiment of the present disclosure.

FIGS. 5 and 6 illustrate methods and systems for secure electronic capture of information printed on checks according to various possible embodiments of the present disclosure. One or both of the systems described in the below systems may be implemented in the secure check capture device of FIGS. 1-2, above. Referring now to FIG. 5, a system 400 for secure electronic capture of checks is shown. The system provides for secure electronic capture of a single check. The system 400 is initiated at a start operation 402, which corresponds to a user providing a check to the system, such as by placing the check in a check feeder or by both placing the check in a check feeder and pressing a button or other input to signal to a device that the check is prepared for scanning.

Operational flow proceeds to a check receipt module 404. The check receipt module 404 corresponds to an electronic check capture device taking in a check provided to it. In one embodiment, the check receipt module 404 occurs in response to the start operation 402. Operational flow proceeds to a scan module 406, which corresponds to scanning the received check to electronically capture the information printed on the check. Information gathered by the system 400 may vary according to the different embodiments of the present disclosure. In one embodiment, an image of the check is captured. In a further embodiment, the scan module 406 optically recognizes the characters printed on the check and stores the scanned information. Scanned information may include, for example, the amount of the check, the payee name, the payor account information, banking institution information, check number, or other information.

Operational flow proceeds to a check acceptance module 408. The check acceptance module 408 determines whether the check was successfully scanned in the scan module 406. The check acceptance module 408 evaluates the information obtained by the scan module 406 to determine if the information was obtained successfully. For example, one or more characters, such as a check routing number, may not be able to be recognized by the selected scanner operated by the scan module 406; therefore, the check acceptance module 408 will indicate that the check was not successfully scanned. If the check acceptance module 408 determines that the check information was successfully scanned, operational flow branches "yes" to a storage module 410. If the check acceptance module 408 determines that the check was not successfully scanned, operational flow branches "no" to a return module 412.

The storage module 410 physically stores the check and electrically stores the successfully collected check information, as determined by the check acceptance module 408. The storage module 410 can be configured to store the check information in a memory of the electronic check capture device, or in the memory of a personal computer associated with the device. In the embodiment of FIGS. 1-2, the storage module 410 physically stores the check in a secure check storage area 103. Other possibilities exist as well. Operational flow proceeds from the storage module 410 to an optional clearance module 414. The clearance module 414 clears the check with the financial institution associated with the gathered check information. For example, the clearance module 414 communicates with a financial institution identified by the check to determine that sufficient funds exist in the identified account. Other actions, such as reserving the funds for fulfillment of the check, may be possible as well.

The return module 412 electronically actuates the device to return the physical check to the user of the device. In the embodiment of FIGS. 1-2, above, the return module outputs the check to the rejected check output chute 106.

Operational flow proceeds from the return module 412 or the clearance module 414 to an end operation 416. The end operation 416 corresponds to completion of operation of the system 400, either by returning the check or by storing the check and the captured check information.

FIG. 6 is a flowchart of methods and systems for secure electronic capture of information printed on checks according to a further possible embodiment of the present disclosure. The system 500 of FIG. 6 generally corresponds to the system 400 of FIG. 5, but is configured to process more than one check at a time. One method by which this may occur is by using a check feeder, such as the check feeder 105 of FIGS. 1-2.

The modules 502-514 correspond to the modules 402-414 of FIG. 5. The system 500 further includes a completion operation 516, which determines whether the system 500 has processed all of the checks presented to the device. If additional checks exist and are presented for processing by the device (such as by being sensed in the check feeder 105 of FIGS. 1-2, operational flow branches "yes" to the receive module 504 to repeat execution of the system 500 on a next sequential check. If no additional checks exist for processing, operational flow branches "no" to an end operation 518, which indicates that the system has completed processing all checks presented to the device.

In various embodiments of the system 500, the optional check clearance module 514 can occur after information is captured from each check. In a further embodiment, the clearance module 514 occurs after execution of the completion operation 516, such that all successfully processed checks are cleared after completion of scanning and storing all of the checks presented to the check clearance device. Other possibilities for operation of the various modules 504-516 are possible as well.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A checking device, comprising:
   a housing having an interior surface and an exterior surface, wherein the interior surface forms a cavity, wherein the cavity is partitioned by a partitioning wall to include
   a check scrutinizer portion, and
   a check storage portion in secure communication with the check scrutinizer portion by way of a successfully scrutinized check output opening formed in the partitioning wall, wherein the housing includes
   a check input opening, and
   an unsuccessfully scrutinized check output opening, wherein each of the check input opening and the unsuccessfully scrutinized check output opening provides access to the check scrutinizer portion of the cavity, wherein the check scrutinizer portion of the cavity includes
   a check feeder in communication with the check input opening,
   a check imaging device in communication with the check feeder, and
   an output chute in communication with the check feeder, wherein the output chute is in communication with the unsuccessfully scrutinized check output opening.

2. The checking device of claim 1, wherein the check imaging device provides
   means for capturing an electronic image of a check in response to the check feeder routing the check through the check imaging device, wherein the electronic image of the check includes
   character information that is related to characters printed on the check, wherein the characters printed on the check includes an amount of the check,
a payee name,
payor account information,
banking institution information,
a check number, and
a check routing number.

3. The checking device of claim 1, further comprising a display integrated into the housing.

4. The checking device of claim 1, further comprising an input device integrated into the housing.

5. The checking device of claim 1, further comprising a controller configured to execute an algorithm, wherein the controller is disposed within the housing, and
an interface configured to permit the controller to communicate with a personal computer.

6. The checking device of claim 2, further comprising a check storage controller in communication with the check imaging device, wherein the check storage controller provides
means for determining if the electronic image of the check was
successfully captured by the check imaging device, or unsuccessfully captured by the check imaging device, wherein the check storage controller is in communication with the check feeder to provide
means for directing the check
out of the housing by one or more of the output chute and unsuccessfully scrutinized check output opening if the electronic image of the check was unsuccessfully captured by the check imaging device, or
into the check storage portion of the cavity by way of the successfully scrutinized check output opening if the electronic image of the check was successfully captured by the check imaging device.

7. The checking device of claim 1 further comprising a key lock integrated into the housing.

8. The checking device of claim 1, wherein the key lock provides
means for limiting access to the check storage portion of the cavity.

9. The checking device of claim 1, further comprising bolts that provide
means for mounting the housing to a surface.

10. A method for operating a checking device, wherein the checking device includes a housing having an interior surface and an exterior surface, wherein the interior surface forms a cavity, wherein the cavity is partitioned by a partitioning wall to include a check scrutinizer portion and a check storage portion in secure communication with the check scrutinizer portion by way of a successfully scrutinized check output opening formed in the partitioning wall, wherein the housing includes a check input opening and an unsuccessfully scrutinized check output opening, wherein each of the check input opening and the unsuccessfully scrutinized check output opening provides access to the check scrutinizer portion of the cavity, wherein the check scrutinizer portion of the cavity includes a check feeder in communication with the check input opening, a check imaging device in communication with the check feeder and an output chute in communication with the check feeder, wherein the output chute is in communication with the unsuccessfully scrutinized check output opening, comprising the steps of:
receiving a check in the check scrutinizer portion by way of the check input opening;
utilizing the check feeder for feeding the check through the check imaging device;
utilizing the check imaging device for electronically imaging information printed on the check;
evaluating an electronic image from the electronically imaging step and determining whether or not the electronic image of the check was successfully captured at the electronically imaging step;
if the electronic image of the check was successfully captured, electronically storing the electronic image and physically storing the check in the check storage portion of the cavity.

11. The method of claim 10, further comprising the step of clearing the check with a financial institution in view of captured information contained in the electronic image.

12. The method of claim 10, wherein imaged information contained in the electronic image includes
characters information that is related to characters printed on the check, wherein the characters printed on the check includes
an amount of the check,
a payee name,
payor account information,
banking institution information,
a check number, and
a check routing number.

13. The method of claim 10, further comprising the step of determining if a second check is positioned for receipt within the check scrutinizer portion.

14. The method of claim 13, further comprising the step of receiving the second check in the check scrutinizer portion.

15. The method of claim 10, wherein evaluating the electronic image step comprises the step of
determining that the electronic image of the check was not successfully captured.

16. The method of claim 15, further comprising the step of outputting the check from the check scrutinizer portion to a rejected check output chute.

17. The method of claim 10 wherein the physically storing the check step further includes the step of
preventing unauthorized users from accessing the check.

* * * * *